Figure 1:
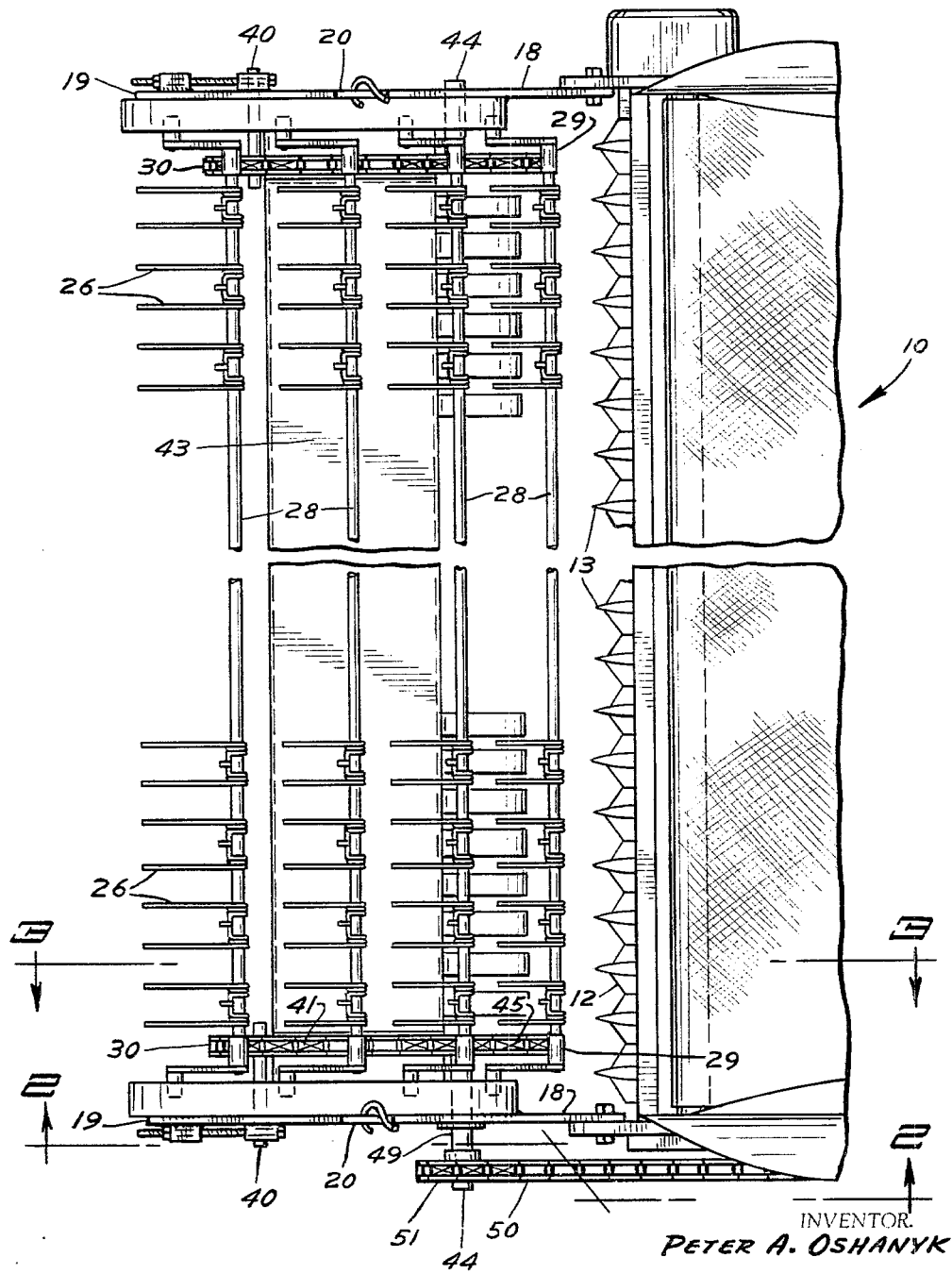

Jan. 18, 1966 P. A. OSHANYK 3,229,454
GUARD SHOE FOR PREVENTING CAM ARM REVERSAL ON COMBINE PICK-UP
Filed June 5, 1964 3 Sheets-Sheet 1

INVENTOR.
PETER A. OSHANYK
BY
Meyers & Peterson
ATTORNEYS

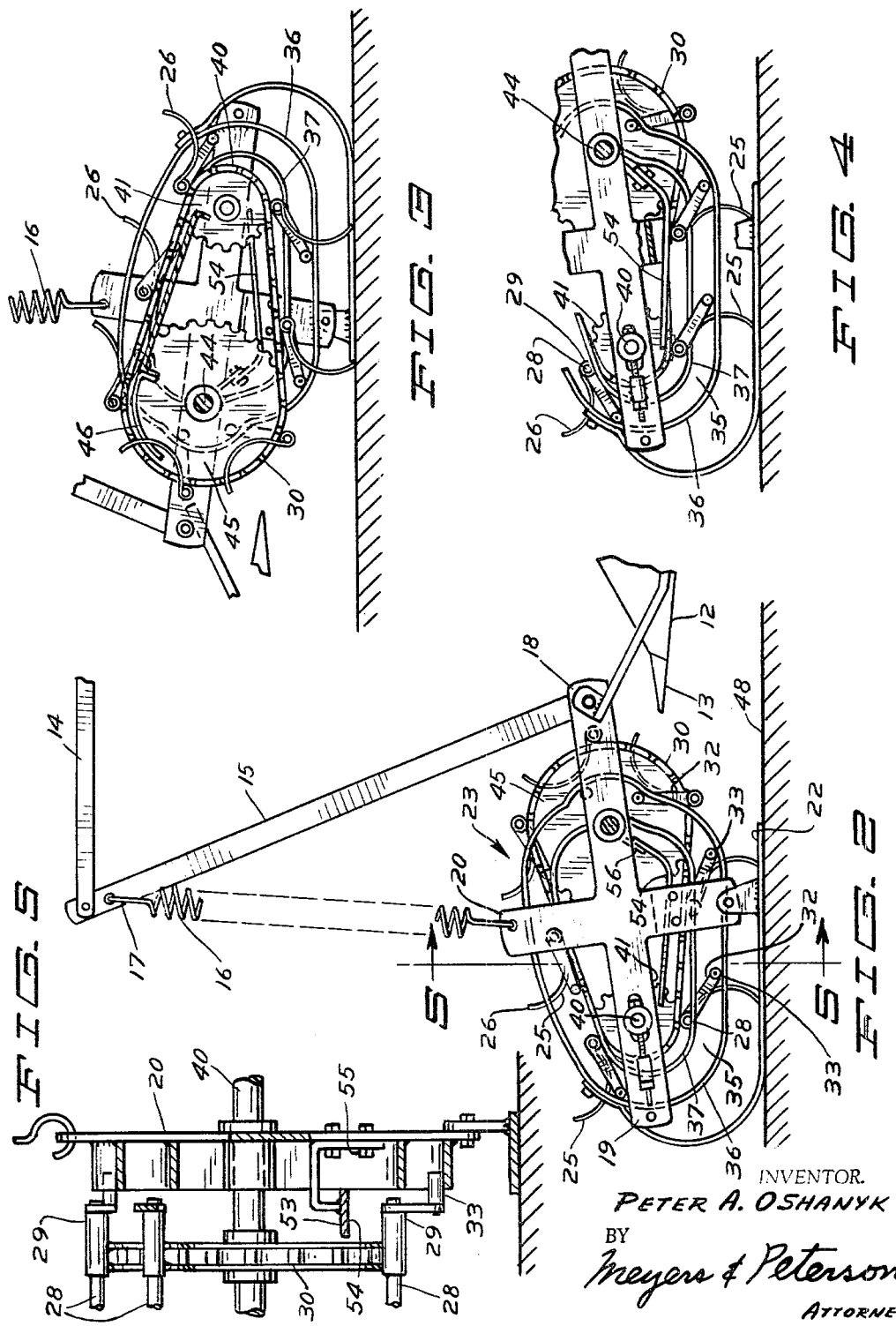

INVENTOR.
PETER A. OSHANYK
BY Meijers & Peterson
ATTORNEYS

United States Patent Office 3,229,454
Patented Jan. 18, 1966

3,229,454
GUARD SHOE FOR PREVENTING CAM ARM
REVERSAL ON COMBINE PICK-UP
Peter A. Oshanyk, Wilton, N. Dak.
Filed June 5, 1964, Ser. No. 372,855
4 Claims. (Cl. 56—364)

This invention relates to a raking or pickup attachment for use in the harvesting of grain or other crops, and more particularly to a free riding pickup attachment which utilizes a plurality of tines secured to a plurality of cam-arms, the tines being arranged to pick up "down" crops, such as small grain, prior to delivering the material to be treated to a combine or other crop-treating apparatus. In the present invention, means are provided for preventing cam-arm reversal in the event the raking or pickup attachment is moved in a reverse direction. The pickup attachment of the present invention is accordingly highly maneuverable and well adapted for field use.

Pickup attachment having teeth or tines have been utilized in the past in connection with a conventional combine or other crop-treating apparatus. The combine or other crop-treating apparatus has a beater bar operating in timed clearance with the pickup teeth or tines for transferring down grain from the ground to the platform of the combine and accordingly, precise timing and positioning of the tines are critical to operation. By the term "down" grain, reference is had to cut grain, as well as grain which has been damaged by wind, hail, or the like. Referring now to the pickup attachment per se, a plurality of tines are secured to a rod, and the rod is in turn secured to an endless belt, the belt having an upper and a lower span. As the pickup unit traverses the field, grain, such as cut, windrowed, or other down grain is picked up and delivered to the apron mechanism of, for example, the combine. During normal operation of such a unit, it frequently becomes necessary to back or otherwise maneuver the unit at the end of a row, or at other times. When backing occurs, the tines along the lower span tend to reverse their angular disposition on the pickup mechanism and unless remedial measures are taken to restore the reversed tines before utilizing the mechanism again, serious damage can result to the pickup unit or attachment. In accordance with the present invention, a guide means or the like is provided adjacent to the lower span of the endless belt carrying the tine supporting rod, and it accordingly becomes impossible for the cam supporting and guiding the rod to reverse its attack angle, and thus cam-arm reversal is no longer a problem. A pickup attachment for combines is described and disclosed in U.S. Patent No. 2,284,777, and the present invention is adaptable for use in connection therewith. Of course, the present invention is readily adaptable for use in connection with various other pickup attachments wherein the tines are maintained in a desired relationship relative to the ground surface by means of a cam track or the like. It will be appreciated that this particular cam track in addition to maintaining the tine carriers in proper disposition will also maintain the individual tines in proper predetermined relationship relative to the adjacent span portion of the endless belt carrying mechanism.

Therefore, it is an object of the present invention to provide an improved pickup attachment for a grain treating device wherein means are provided for permitting the pickup device to be moved and maneuvered in either forward or backward direction without fear of upsetting the relationship of the cam guides relative to the pickup tines.

It is a further object of the present invention to provide an improved pickup attachment for combines or other grain-treating apparatus wherein a guide mechanism is utilized to control the disposition of the grain engaging tines without regard for the direction of movement of the tine relative to the surface of the ground.

Figure 6:
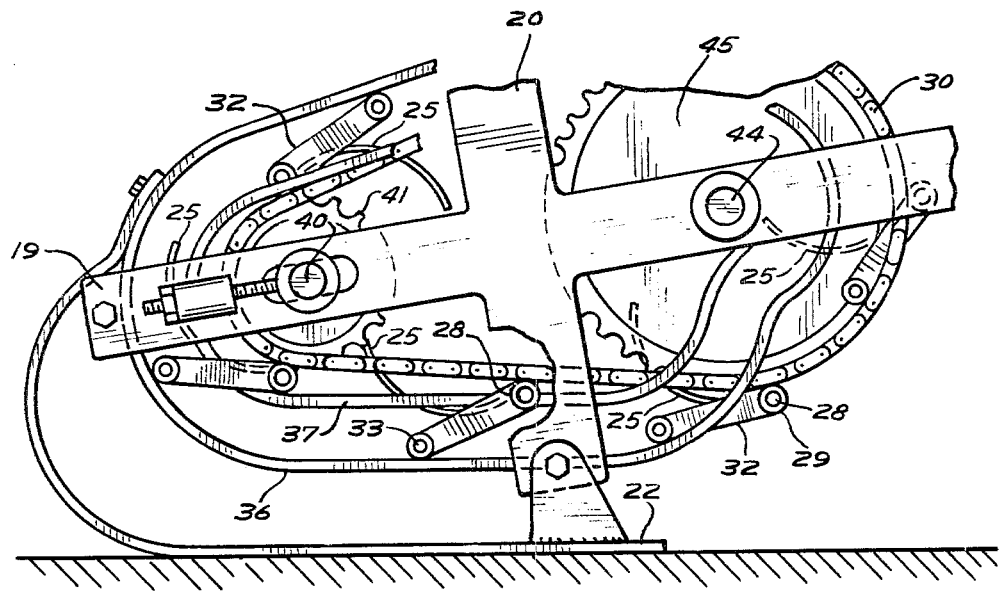

Other and further objects of the present invention will become apparent to those skilled in the art upon a study of the following specification, appended claims, and accompanying drawings wherein:

FIGURE 1 is a top plan view of the forward end of a combine to which is attached the pickup attachment of the present invention, the medial portion of the attachment being a mere duplicity, and therefore being cut away from the view, FIGURE 2 is a vertical sectional view taken along the line and in the direction of the arrow 2—2 of FIGURE 1, FIGURE 3 is a vertical sectional view taken along the line and in the direction of the arrow 3—3 of FIGURE 1, FIGURE 4 is a fragmentary view of that portion of the device shown in FIGURE 2 with a portion of the frame being broken away, and showing one of the tines and its cam-arm in the disposition which is assumed upon reversal of the pickup mechanism, FIGURE 5 is a vertical sectional view taken along the line and in the direction of arrow 5—5 of FIGURE 2, and FIGURE 6 is a view similar to FIGURE 2 showing the equipment when cam-reversal occurs without having the guide means of the present invention available.

With particular attention to the drawings, the preferred modification of the present invention as shown therein is intended to be attached to a conventional combine generally designated 10 and having a platform, apron or the like for receiving grain or the like thereon (not shown), together with a sickle mechanism 12 and guard 13 as shown in FIGURE 2. The combine is provided with rigid forwardly extending arms 14 which are pivotally connected to struts 15 and which partially support the pickup attachment unit. The coil spring 16 may be utilized in order to support the remaining weight of the pickup unit, as desired. The strut 15 is secured to the rear portion 18 of the cross frame 19, the spring 16 being attached, as indicated, to the upright member 20 of the frame 19. A pair of skids or runners 22 are utilized to support the weight of the pickup attachment generally designated 23, the remaining portion of the weight being supported by the spring member 16. The present invention relates specifically to the provision of a guide rail means or the like for maintaining the drive mechanism for the individual tines along the lower span of the endless belt in proper relative disposition.

The pickup mechanism generally designated 23 may be of any suitable structure wherein cut grain may be picked up and moved upwardly and rearwardly to a position ahead of a grain-treating device such as the combine 10 so as to clear the combine parts including the sickle guards 13. The pickup mechanism 23 which is shown in the present application is generally similar to that disclosed in Patent No. 2,284,777, and consists of a plurality of teeth or tines 25 positioned in row formation across the extent thereof. The outer end of each tooth or tine is curved outwardly to terminate in a transverse termination line 26. Each tine is rigidly mounted upon a lateral rod or carrier 28 which, in turn, is rockably journaled within spaced and aligned bearings 29, each pair of which are respectively mounted on opposite edge areas of the endless chain belt 30. A radius arm 32 is secured to each of the shafts 28 at one end and has, at the other end, a cam follower or roller 33 which, in turn, is adapted to ride in the pathway 35 defined by an outer cam track 36 and an inner cam track 37. A forward transverse shaft 40 is journaled across the pickup mechanism and has secured thereto a pair of sprockets 41—41, each sprocket being in alignment with a respective endless belt or chain 30. A pan or the like 43 is disposed across the mechanism and lies under the tooth structure as it passes thereover in its uppermost rearward traveling span or portion. A rear transverse drive shaft 44 is journaled across the pickup device 23 and has secured coaxially therewith a pair of sprocket wheels 45—45, each of which is in alignment with the endless chain or belt 30. The pan 43 has secured rearwardly thereof a plurality of stripper bars or the like 46—46 disposed in alternate relation with the projected pathways of the individual tines 25 in the revolving movement of the tine structure in the raking mechanism.

It will be observed that the roller 33 follows in the pathway 35 which is adjacent to the path taken by the spans of the endless chain 30. As a result, the curved tine structures are positioned in a horizontal cradle in their uppermost travel, but quickly fall inwardly as they begin their downward descent through stripper bars 46, as seen in FIGURES 2 and 3. As each tooth structure continues downwardly, the curved teeth are again caused to emerge and extend downwardly so as to either lightly contact or travel in spaced clearance with the surface of the ground 48, as clearly illustrated in FIGURE 2.

In order to prevent digging and gouging by the teeth 25, it is important to maintain the entire raking mechanism 23 in spaced parallel clearance with the surface of the ground 48. This may be accomplished by several means, but it is generally preferable to utilize a pair of skids or runners 22 which are secured in depending relation with respect to the underside of the raking mechanism and which will glide smoothly and surely along the ground surface 48 irrespective of undulations and contours in the surface thereof. When skids are used, in order to assist the raking mechanism in its forward ground-contacting movement, it is generally preferable to suspend a substantial portion of the weight of the mechanism by such means as the tension spring 16. This spring terminates downwardly in a hook engageable with a hole or the like in the upper part of the supporting frame mechanism 20. The upper end of spring 16 terminates in a hook 17 which is secured to the rigid strut 15 which is pivotally secured to the arm 14 extending forwardly of the combine 10.

The combine 10 may be provided with a draper mechanism, if desired, one type of draper suitable in connection with this apparatus being described in detail in Patent No. 2,874,824. Of course, other draper mechanisms may be utilized, as desired.

The chain mechanism 50, which is driven either by a power takeoff unit or by the rotational energy of a wheel supported shaft of the combine 10, is provided for driving the pickup mechanism 23. Accordingly, the endless chain 50 drives sprocket 51 which is secured to the shaft 44 for axial rotation therewith. This, of course, causes simultaneous rotation of the shaft 40 with the shaft 44. Chain 50 is operatively associated with a sprocket (not shown) which is in turn secured to a wheel supported shaft of the combine.

Attention is now directed to the shoe 53, as shown in FIGURES 2 and 5, this shoe having a bearing or span contacting surface 54, and being secured to the frame 20 by means of the bolt assembly 55, as well as by the carrier assembly 56.

It will be observed that the surface 54 of the shoe 53 is disposed closely adjacent to the surface of the bearings 29 of the radius arms 32. With particular attention being directed to FIGURE 4, it will be observed that normal operation and disposition of the radius arms and bearings causes the surfaces of the bearings to contact the bearing surface 54 of the shoe 53 when the pickup unit is backed up. If the pickup unit is backed up, under which circumstances the shafts 40 and 44 may rotate in a direction opposite to the normal working direction particularly when powered or driven by a wheel of the unit, there will be a tendency for the individual tines 25 and radius arm 32 to pivot in a clockwise direction about the rod 28. This movement or pivotal rotation of the tines 25 will be limited because of the positioning of the working surface 54 of the shoe 53. Lacking the interpositioning of the shoe 53, the tines would otherwise be permitted to move substantially unlimited in a clockwise direction and ultimately become fouled in the remaining portions of the mechanism. In other words, the reverse movement of the pickup equipment across the surface of the ground 48 will cause the radius arms or cams 32 to reverse their direction of inclination by approximately 90 degrees. Since the tension on the endless chain 30 must be sufficiently relaxed to permit ordinary operation between and about the sprockets 41 and 45, and since the amount of slack which is normally permitted in the chain 30 is sufficient to permit radial arm reversal, trouble will occur when the pickup mechanism is backed up unless the bearing surface 54 is available. With particular attention directed to FIGURES 2 and 4, the disposition of the tines 25, if cam or radial arm reversal occurs, will be such that the end portion 26 of any lateral end tines offset from its normal position may tend to become fouled in the chain and drive mechanism of the pick-up attachment 23, as well as becoming fouled in the cam surfaces and in the remaining apparatus of the pickup unit or becoming ineffective to pick up grain if reversed. The presence of the bearing surface 54 of the shoe 53 permits the chain 30 to run with the normal amount of slack and at the same time, prevents the reversal of the radius or cam arm 32. Accordingly, the unit may be backed and maneuvered at will. In addition to this feature, the shoe surface 54 provides a normal top running surface for the bearing member 29 whenever the nature of the down crop is such that the ends 26 of the tine 25 should be in actual contact with the ground surface.

It will of course be understood that various changes may be made in the form, details, arrangements and proportions of the parts without departing from the scope of the invention as set forth in the appended claims.

I claim:

1. A raking mechanism for picking up and elevating down grain and the like comprising a plurality of substantially rigid tines disposed in row formation with the outer end of each tooth being curved outwardly and the inner end being rigidly mounted along a laterally extending shaft, such shaft being rotatably journaled within spaced and aligned bearing members, means securing said aligned bearing members on an endless belt for movement therewith along a lower crop gathering span and along an upper span, a radius arm secured along a first end thereof to said laterally extending shaft and having a cam follower at the other end and adapted for travel along a certain path defined by a pair of cam surfaces with the first end normally leading said other end when traversing said lower span, and a guide means disposed adjacent said cam surface along said lower span and extending longitudinally along substantially the entire extent of said lower span for maintaining said aligned bearing members in a predetermined path therealong in order to retain the first end of said radius arm in leading relationship relative to the other end thereof along said lower span.

2. The pickup mechanism as set forth in claim 1 being particularly characterized in that said guide means comprises a strip disposed in substantially parallelly disposed relationship with said cam surfaces for preventing the elevation of said aligned bearing members beyond a certain predetermined elevation relative to the cam surfaces along said lower span while traversing said lower span.

3. A raking mechanism for picking up and elevating down grain and the like comprising a plurality of substantially rigid tines disposed in row formation with the outer end of each tine being curved outwardly and the inner end being rigidly mounted along laterally extending shaft, said laterally extending shaft being rotatably journaled within spaced and aligned bearing members adjacent the ends thereof, means securing said aligned bearing members on an endless belt for movement therewith, the belt traversing a lower crop gathering span and an upper span, a radius arm having a certain predetermined length secured at a first end thereof to said laterally extending shaft and having a cam follower at the other end adapted for travel along a certain path defined by inner and outer cam track surfaces with the first end leading said other end along said lower span, and guide strip means disposed along said cam track surfaces along said lower span and extending longitudinally along substantially the entire extent of said lower span for maintaining said aligned bearing members in a predetermined path along said lower span in order to retain the first end of said radius arm in leading relationship relative to the other end thereof along said lower span, the distance between said guide strip means and said lower cam track surface being less than the length of said radius arm.

4. The raking mechanism as set forth in claim 3 being particularly characterized in that said guide strip means is arranged substantially immediately above, generally parallelly to, and coextensive with the length of said lower crop gathering span.

References Cited by the Examiner
UNITED STATES PATENTS

| | | | |
|---|---|---|---|
| 2,284,777 | 6/1942 | Sund | 56—364 |
| 2,795,100 | 6/1957 | Sund | 56—364 |

ABRAHAM G. STONE, *Primary Examiner.*

RUSSELL R. KINSEY, *Examiner.*